US012696232B2

(12) United States Patent
Gremaud et al.

(10) Patent No.: US 12,696,232 B2
(45) Date of Patent: Jul. 28, 2026

(54) GENERATING AND UPDATING ELECTRONIC AUTHORIZATION CONTENT USING AUTOMATED POSITIONING IN A PHYSICAL ENVIRONMENT

(71) Applicant: NAGRAVISION SARL,
Cheseaux-sur-Lausanne (CH)

(72) Inventors: Fabien Gremaud,
Cheseaux-sur-Lausanne (CH); Serge Dubrova, Cheseaux-sur-Lausanne (CH)

(73) Assignee: NAGRAVISION SARL,
Cheseaux-sur-Lausanne (CH)

( * ) Notice: Subject to any disclaimer, the term of this patent is extended or adjusted under 35 U.S.C. 154(b) by 367 days.

(21) Appl. No.: 18/300,469

(22) Filed: Apr. 14, 2023

(65) Prior Publication Data

US 2024/0349233 A1     Oct. 17, 2024

(51) Int. Cl.
H04W 64/00          (2009.01)
(52) U.S. Cl.
CPC ................................. H04W 64/003 (2013.01)
(58) Field of Classification Search
CPC ... H04W 64/003; H04W 12/06; H04W 88/02;
H04W 12/63; H04W 4/029; H04W 4/021;
H04W 12/126; H04W 12/12; H04W
12/30; H04W 12/082; H04W 4/02; H04W
12/02; H04W 12/08; H04W 12/065;
H04W 12/068; H04W 12/64; H04W
4/023; H04W 4/026; H04W 12/40; H04W
12/68; H04W 4/025; H04W 4/21; H04W
12/65; G07C 9/27; G07C 9/28; G07C
2209/63; G07C 9/00571; G07C 9/257;
G07C 9/00563; G07C 9/37; G07C 9/20;
G07C 9/25; G07C 9/253; G07C 9/26;

G07C 9/33; G07C 1/10; G07C 9/00896;
G07C 9/23; G07C 9/38; G07C
2009/00976; G07C 9/32; G07C 2011/02;
G07C 9/00; G07C 9/00309; G07C
9/00912; G07C 9/15; G07C 2209/02;
G06F 21/32; G06F 21/33;
G06F 21/31; G06F 2221/2111; G06F
17/00; G06F 21/88; G06F 3/0488; G06F
3/017; G06F 17/40; G06F 21/35; G06F
3/013;
(Continued)

(56) References Cited

U.S. PATENT DOCUMENTS

| | | | |
|---|---|---|---|
| 2014/0015978 A1* | 1/2014 | Smith ..................... | G07B 15/02 |
| | | | 348/156 |
| 2014/0282929 A1* | 9/2014 | Tse ..................... | G07C 9/00309 |
| | | | 726/5 |

(Continued)

OTHER PUBLICATIONS

Extended European Search Report dated Sep. 20, 2024 in corresponding European Application No. 24170040.0, 12 pages.

*Primary Examiner* — Nimesh Patel
(74) *Attorney, Agent, or Firm* — Maier & Maier, PLLC

(57)               ABSTRACT

A method for automated authorization within a restricted perimeter, comprising receiving, via processing circuitry, a digital credential of a first device, a location of the first device within the restricted perimeter, and an image of an area within the restricted perimeter; verifying the digital credential; identifying a presence of an occupant in the image; associating the occupant with the digital credential and the location of the first device based on the image; and authorizing the occupant based on the digital credential and the location of the first device.

20 Claims, 6 Drawing Sheets

(58) Field of Classification Search
CPC ...... G06F 18/22; G06F 18/2411; G06F 21/50; G06F 2221/2113; G06F 2221/2117; G06F 2221/2149; G06F 2221/2103; G06F 21/629; G06F 21/316; G06F 16/285; G06F 18/213; G06F 18/253; G06F 16/955; G06F 21/60; H04L 63/0861; H04L 63/08; H04L 67/02; H04L 63/10; H04L 63/102; H04L 63/0823; H04L 63/0838; H04L 9/3231; H04L 63/083; H04L 63/1408; H04L 63/107; H04L 9/3271; H04L 67/54; H04L 9/3268; H04L 9/3228; H04L 9/0866; H04L 63/0807; H04L 12/282; H04L 67/52; H04L 67/535; H04L 67/06; H04L 2463/082; H04L 63/0876; H04L 63/0853; H04L 63/126; H04L 9/3247; H04L 2209/80; H04L 63/061; H04L 63/101; H04L 41/084; H04L 63/12; G06Q 20/40; G06Q 20/40145; G06Q 10/10; G06Q 40/00; G06Q 50/184; G06Q 20/4015; G06Q 20/325; G06Q 20/02; G06Q 50/265; G06Q 20/4016; G06Q 20/3825; G06Q 20/3829; G06V 40/172; G06V 40/166; G06V 40/12; G06V 40/165; G06V 40/1365; G06V 40/10; G06V 40/1347; G06V 40/161; G06V 40/168; G06V 40/18; G06V 10/467; G06V 40/1353; G06V 40/67; G06V 10/14; G06V 20/52; G06V 20/80; G06V 20/53; G06V 40/16; G06V 40/171; G06V 10/70; G06V 20/58; G06V 40/20; G06V 40/70; G06V 40/00; G06V 40/174; G06V 40/40; G06V 10/761; G06V 10/764; G06V 10/82; G06V 40/176; G06V 20/50; G06V 10/145; G06V 40/50; G06V 20/46; G06V 20/48; G06V 10/17; G06V 40/179; G06V 10/95; G06V 10/25; G06V 10/44; G06V 2201/07; G06V 40/193; G06V 40/23; G06V 10/235; G06V 10/806; G06V 10/752; G06V 30/10; G06V 40/197; G06V 40/28; G06V 40/33; G08B 25/10; G08B 7/06; G08B 21/24; G08B 13/19; G08B 13/19602; G08B 13/19613; G08B 13/19645; G08B 17/06; G08B 21/0261; G08B 21/22; H04M 1/724634; H04M 1/72457; H04M 1/72454; H04M 1/72463; H04M 2207/18; H04M 2242/30
See application file for complete search history.

(56) References Cited

U.S. PATENT DOCUMENTS

| | | | |
|---|---|---|---|
| 2016/0343187 A1* | 11/2016 | Trani | H04W 4/021 |
| 2017/0076522 A1* | 3/2017 | Ives-Halperin | |
| | | | G06Q 20/40145 |
| 2017/0186253 A1* | 6/2017 | Schlechter | G07C 9/28 |
| 2018/0275859 A1* | 9/2018 | Hodge | G06F 1/1673 |
| 2021/0082217 A1 | 3/2021 | Caruana et al. | |
| 2021/0383626 A1* | 12/2021 | Dominici | G07C 9/28 |
| 2024/0046729 A1* | 2/2024 | Richard | G07C 9/257 |

* cited by examiner

Read occupant credentials from user device ------110

Transmit occupant credentials to server ------120

Verify occupant credentials ------130

Detect presence of occupant in image ------140

Transmit presence to server ------150

Localize user device using wireless protocol ------160

Transmit location to server ------170

Locate unauthorized occupants ------180

*FIG. 3*

GENERATING AND UPDATING ELECTRONIC AUTHORIZATION CONTENT USING AUTOMATED POSITIONING IN A PHYSICAL ENVIRONMENT

BACKGROUND

Field of the Disclosure

The present disclosure relates to automated authorization in an environment.

Description of the Related Art

In restricted areas, it is typically required for credentials to be presented and electronically or manually verified in order for a person to proceed through an entrance or similar checkpoint. In many cases, the credentials can only be authenticated at the checkpoint, which can lead to bottlenecks at specific locations throughout the restricted area. The authentication process at the checkpoint can be inefficient and can result in authentication of counterfeited credentials, especially when scaled for large areas and crowds.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

In one embodiment, the present disclosure is directed to a method for automated authorization within a restricted perimeter, comprising receiving, via processing circuitry, a digital credential of a first device, a location of the first device within the restricted perimeter, and an image of an area within the restricted perimeter; verifying, via the processing circuitry, the digital credential; identifying, via the processing circuitry, a presence of an occupant in the image; associating, via the processing circuitry, the occupant with the digital credential and the location of the first device based on the image; and authorizing, via the processing circuitry, the occupant based on the digital credential and the location of the first device.

In one embodiment, the present disclosure is directed to a device comprising processing circuitry configured to receive a digital credential from a first user device, a location of the first user device within a restricted perimeter, and an image of an area within the restricted perimeter, verify the digital credential, identify a presence of an occupant in the image, associate the occupant with the digital credential and the location of the first user device based on the image, and authorize the occupant based on the digital credential and the location of the first user device.

In one embodiment, the present disclosure is directed to a non-transitory computer-readable storage medium for storing computer-readable instructions that, when executed by a computer, cause the computer to perform a method, the method comprising receiving a digital credential from a first device, a location of the first device within a restricted perimeter, and an image of an area within the restricted perimeter,; verifying the digital credential; identifying a presence of an occupant in the image; associating the occupant with the digital credential and the location of the first device based on the image; and authorizing the occupant based on the digital credential and the location of the first device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a schematic of a networked system for authorizing occupants in an environment, according to an exemplary embodiment of the present disclosure;

FIG. 3 is a schematic of a system for authorizing occupants in an environment, according to an exemplary embodiment of the present disclosure;

DETAILED DESCRIPTION

Figure 2:
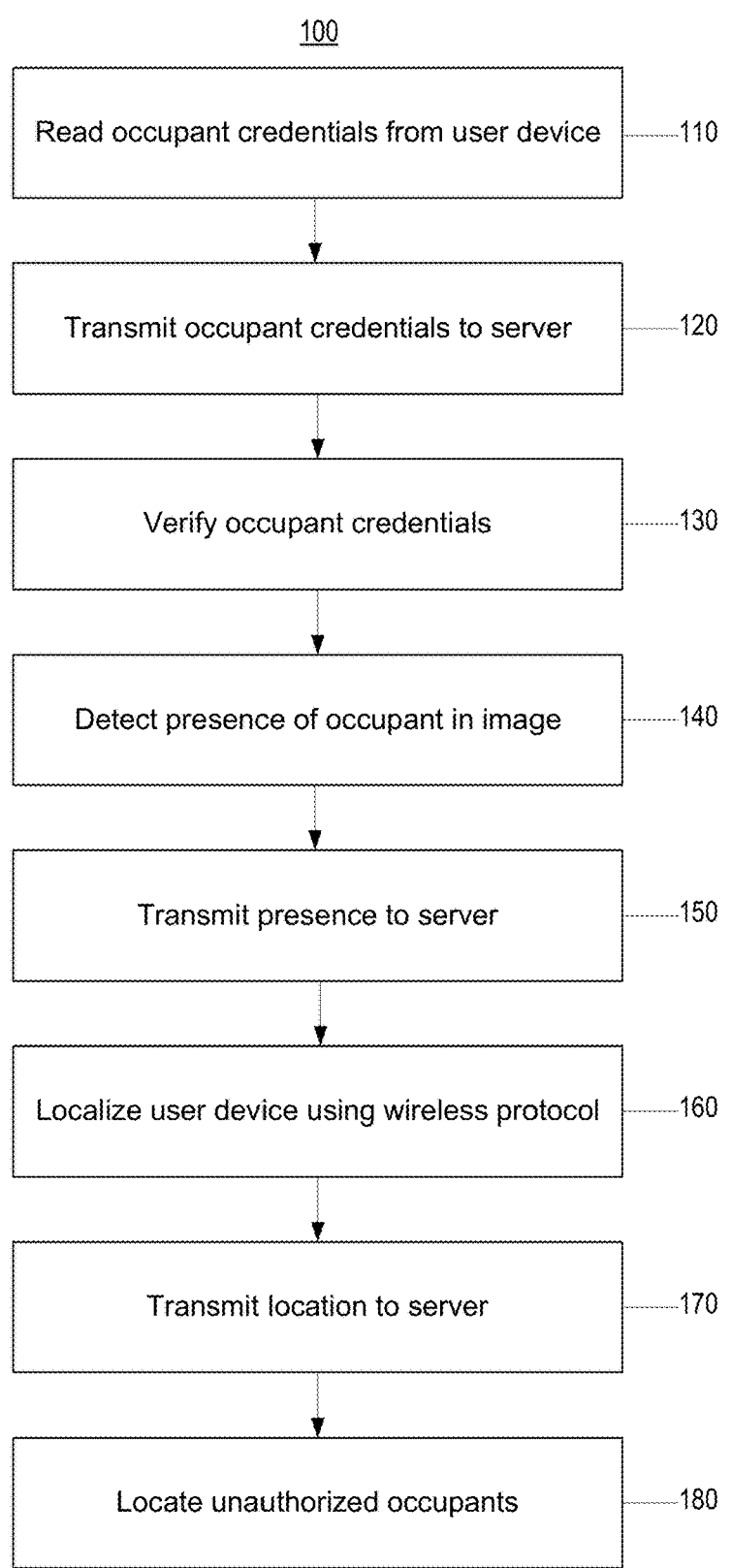
FIG. 2 is a method for authorizing occupants in an environment, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

There are many situations where it is necessary to check each person entering into an environment and confirm that they are authorized to access the environment. Typically, an establishment such as a concert venue accomplishes this authorization by blocking the entrance into the venue until a person presents their ticket. The ticket can be checked manually by a guard who then lets the person through the entrance. This setup is dependent on human labor and creates bottlenecks when many people are entering the venue at the same time. Even when an electronic scanner is used to check that each person's ticket is legitimate, there are still sources of delay and inefficiency. For example, each person has to be checked individually through a limited number of entry points and must wait for the ticket to be authorized before entering the venue. The process for authorizing occupants is further complicated when additional restrictions or requirements are added. For example, passengers on a train can buy tickets for specific seats. Each passenger is only authorized to be in the seat corresponding to their ticket. There are two steps to verifying the passenger. First, the passenger's presence on the train must be verified against the passenger's train ticket. Second, the passenger's specific location must be verified against the seat on the passenger's train ticket to confirm that the passenger is in the correct seat. This authorization of the passenger's ticket and seat is almost always manually performed by a conductor who checks each passenger individually. The conductor's job can be time-consuming and vulnerable to falsified documentation or human error.

There is therefore a need to automate and streamline the process of authorizing a group of people in an environment by using digital data transmission. In one embodiment, the present disclosure is directed to systems and methods for detecting a presence of individuals in an environment, localizing the individuals, and determining whether the individuals are authorized to be in the environment without requiring any manual reporting or data entry. The environment can be any indoor environment or outdoor environment. In one embodiment, the environment can be an enclosed space wherein the boundaries are enforced by physical structures such as a fence or walls. Additionally or alternatively, the boundaries of the environment can be virtually enforced by a geofence or similar mechanism. The geofence can be a virtual boundary that is established and detected using location-based services. In one embodiment, the boundaries of the environment can be defined by transmitters. A transmitter can be, for example, a location-enabled beacon located at or inside the boundary of the environment. The systems and methods of the present disclosure enable an automated enforcement of boundaries. For example, an occupant can be automatically detected when they enter an environment and an authorization related to the occupant can be extracted and linked to the presence or location of the occupant. Advantageously, the occupant can be authorized while they are moving through the environment, and the authorization is not limited to a designated checkpoint. The occupant does not need to stop and provide information to an authority figure, as the necessary data for authorization can be extracted and verified in an automated manner by the systems and methods described herein. As a result, the present disclosure also provides for identifying unauthorized occupants who do not have valid credentials to be in an environment. Further methods disclosed herein can provide for tracking of the occupant in order to maintain up-to-date authorization and access data.

Figure 1:
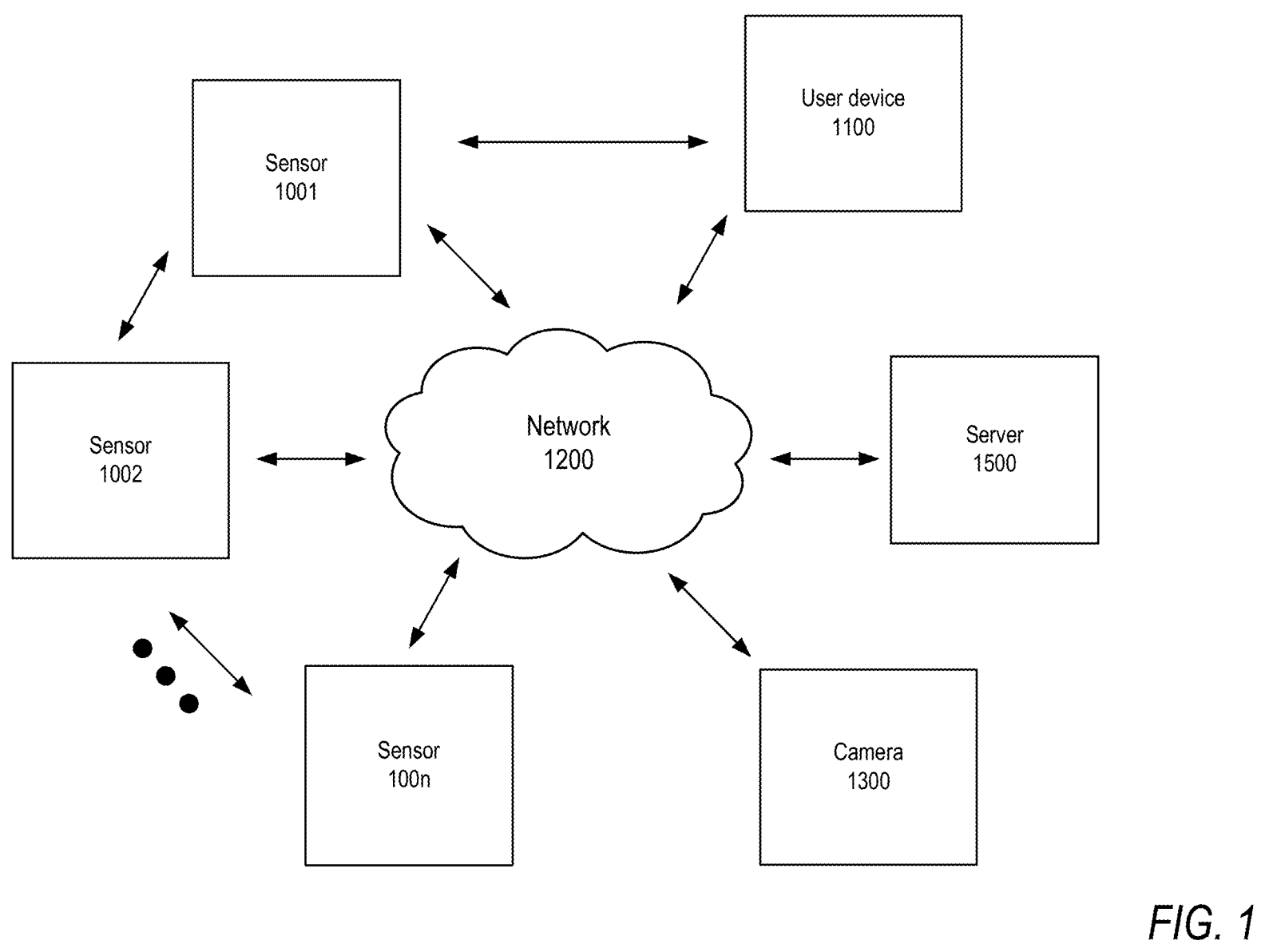

FIG. 1 is a schematic of a networked device, such as a server 1500, in communication with a first sensor 1001, a second sensor 1002, an nth sensor 100n via a network 1200, according to one embodiment of the present disclosure. Each of the sensors 1001, 1002, 100n can be configured to communicate with a user device 1100. The user device 1100 can be any electronic device, including, but not limited to, a smartphone, a smart wearable, a personal computer, a tablet, an IoT (Internet of Things) device, or the like. The user device 1100 can be a portable personal device carried by an occupant in an environment. The user device 1100 can store or access data related to the occupant, such as occupant credentials for the present environment. Each of the sensors

1001, 1002, 100n can be configured to communicate wirelessly with the user device 1100 to access the occupant credentials.

In one embodiment, the communication between a sensor 1001 and the user device 1100 can be via an ultra-wideband (UWB) or Bluetooth (BLE) communication protocol. In one embodiment, the sensors can be in communication with each other, e.g., via a UWB or BLE communication protocol. The sensors can access data from the user device 1100 and transmit the data to the server 1500 via the communication network 1200. In one embodiment, the server 1500 can communicate directly with the user device 1100 via the communication network 1200. In one embodiment, the server 1500 can further be in communication with at least one camera 1300 via the communication network 1200. The camera 1300 and the sensors 1001, 1002, 100n, can be located within an environment and can transmit data to the server 1500. The server 1500 can be a remote server, e.g., not located within the environment. The server 1500 can use the data from the sensors 1001, 1002, 100n and the camera 1300 to locate and authorize an occupant in the environment, the occupant being in possession of the user device 1001.

FIG. 2 illustrates a method 100 for authorizing occupants in an environment, according to one embodiment of the present disclosure. Each step in the method will be described in further detail herein. In one embodiment, the method 100 can be used to authorize an occupant carrying an electronic user device, such as the user device 1100 of FIG. 1, when the occupant enters an environment with defined boundaries. First, occupant credentials can be read or received from the user device by a sensor when the occupant enters the environment in step 110. The sensor can be a transceiver device configured to transmit and receive data. The sensor can be, for example, one of the sensors 1001, 1002, 100n of FIG. 1. The occupant credentials can include, for example, an electronic ticket stored on the user device. The sensor can transmit the occupant credentials via a communication network to a networked device, such as the server 1500 of FIG. 1, in step 120. The server 1500 can verify the occupant credentials in step 130. As an example, the electronic ticket can be verified to confirm that the ticket is genuine and that the date of entry is the present date.

The presence of the occupant in the environment can be detected in step 140. As an example, the camera 1300 of FIG. 1 can capture an image of the environment and can detect the occupant in the image. The presence of the occupant can be transmitted by the camera to the server 1500 in step 150. A sensor, such as the sensors 1001, 1002, 100n of FIG. 1, can determine the location of the occupant in the environment by localizing the user device using a wireless localization protocol in step 160. In one embodiment, the localization protocol can be a short-range method such as ultra-wideband (UWB) positioning or Bluetooth (BLE) positioning. The sensor can transmit the location of the occupant to the server 1500 in step 170. The presence data, the location data, and the credential verification can be combined by the server 1500 to identify and locate unauthorized occupants in step 180. According to one implementation, unauthorized occupants can be identified as occupants whose occupant credentials cannot be verified.

It can be appreciated that the steps described herein can be executed in a number of arrangements and sequences, and that the method of FIG. 2 is merely presented as a non-limiting embodiment. For example, the presence of occupants can be detected via analysis of image data before the sensor localizes a user device or reads the occupant credentials from the user device. According to one example, the camera 1300 can transmit image data of the environment to the server 1500. The server 1500 can be configured to identify the presence of an occupant in the image data. In one embodiment, detecting the presence of an occupant in image data can be coupled with the localization of the occupant's user device to determine the location of the occupant. The image data can be used as an additional or alternative source of data for determining where the occupant is located in the environment. According to one embodiment, the user device of the occupant can be localized by the sensor before the occupant credentials are read from the user device. In one embodiment, the location of the occupant can be used to verify the credentials and authorize the occupant. The server can first receive the occupant credentials and additional information related to the occupant, such as the location or an image, before verifying the occupant credentials.

In some embodiments, the method 100 can include steps for enabling a user device 1100 to acquire occupant credentials. For example, a sensor can attempt to receive occupant credentials from a user device that cannot access occupant credentials in step 110. If the sensor does not receive any occupant credentials, the sensor can transmit an indication to the server 1500 that the user device cannot access occupant credentials. The server 1500 or the sensor can transmit an instruction or a request to the user device to access or acquire occupant credentials. For example, the instruction can include an address of a website where occupant credentials can be acquired by the user device. The user device can access the occupant credentials using the instruction and transmit the occupant credentials to the sensor. The method can then continue to step 120, wherein the sensor can transmit the newly acquired occupant credentials to the server 1500.

Figure 3:
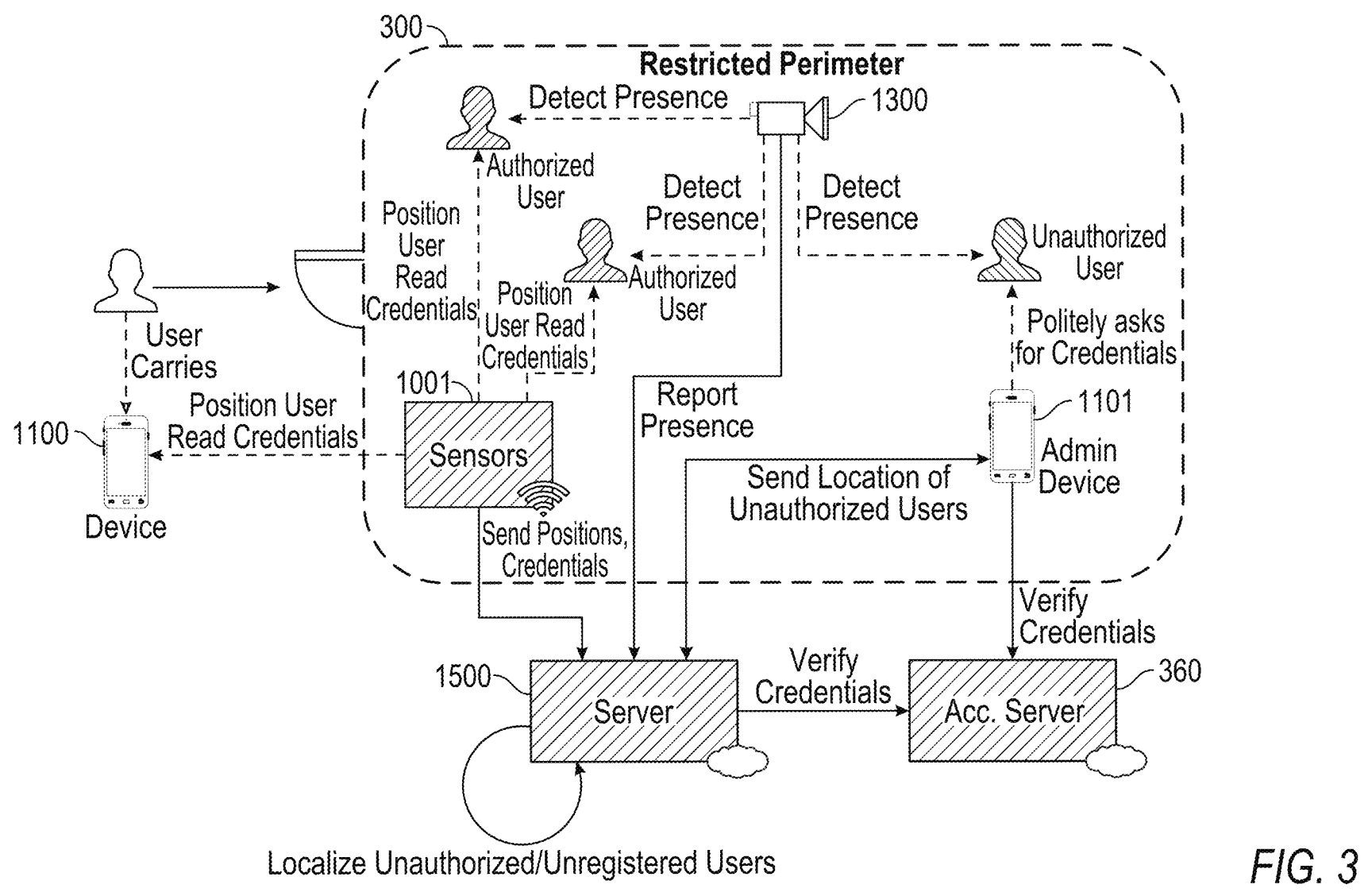

FIG. 3 illustrates a schematic of a server in communication with devices in a restricted perimeter 300, according to one embodiment of the present disclosure. The server can be the server 1500 of FIG. 1 in network communication with the sensors 1001, 1002, 100n and the at least one camera 1300. The restricted perimeter 300 can define a restricted environment inside the perimeter where occupants are to be authorized. The server can host a detection service, wherein the detection service can be a module, algorithm, program, application, or the like configured to execute any of the steps described herein for identifying and authorizing occupants in a restricted environment. In one embodiment, the server can be more than one server. For example, the detection service can be distributed across more than one server or similar networked devices. The sensors 1001 can read occupant credentials from a user device being carried by an occupant. The user device can be the user device 1100 of FIG. 1. The sensors 1001 can also determine the location of the occupant based on the location of the user device 1100 being carried by the occupant. The sensors can transmit the location of the occupant and the occupant credentials to the server 1500. The camera 1300 can capture images of occupants within the restricted perimeter. In one embodiment, the camera 1300 can be connected to a processor, wherein the processor is configured to detect the presence of occupants in the images. The camera 1300 can transmit the presence of the occupant in one or more images to the server 1500.

In one embodiment, the server 1500 can determine whether the occupant is authorized to be within the restricted perimeter based on the occupant credentials. In one embodiment, the server 1500 can verify the occupant credentials based on access data, wherein the access data can include a set of valid occupant credentials. The server 1500 can identify a presence or absence of the occupant credentials in the access data to verify the occupant credentials. In one embodiment, the server 1500 can compare the occupant credentials with the access data to determine whether the occupant credentials match the access data. If the occupant credentials are verifiable against the access data, the occupant can be authorized. If the occupant credentials are not verifiable against the access data, it is possible that the occupant is not authorized. In one embodiment, the server 1500 can be in network communication with a second remote device, such as a second server. The second server can be an access server 360 as illustrated in FIG. 3. The access server 360 can store data, such as the access data, that can be used to verify the occupant credentials. In one embodiment, the access server 360 can be an identity and access management (IAM) server. According to some embodiments, the verification of the occupant credentials can be performed by the server 1500, the access server 360, or a combination of the servers. For example, the server 1500 can transmit data, including the occupant credentials, to the access server 360. The access server 360 can transmit data, such as access data or a verification response, to the server 1500 in order to authorize the occupant. The server 1500 can use the verification, as well as the location data from the sensors 1001 and the presence data from the camera 1300, to localize unauthorized users. Unauthorized users are users whose occupant credentials cannot be verified. In one embodiment, the server 1500 can transmit instructions via a communication network to a user device. The user device can be, for example, an administrative device 1101 carried by/associated with an authoritative person who has authority to monitor the users present in the perimeter 300. The administrative device can be a device such as the user device 1100 of FIG. 1. The administrative device 1101 can be a user device configured to request and access occupant credentials and authorization data generated or stored by the server 1500. In some embodiments, this data is not accessible by user devices associated with occupants who are not administrative or authoritative persons within a restricted perimeter. The administrative device 1101 can also receive the instructions from the server 1500. The instructions can include an identification of an unauthorized user, a location of the unauthorized user, and a request for additional credentials from the unauthorized user. The administrative device 1101 can be used to physically locate and identify the unauthorized user and request the additional credentials. The administrative device 1101 can then transmit the additional credentials to a remote device (e.g., the server 1500, the access server 360) to re-verify the user. The server 1500 can maintain a record of unauthorized users. The server 1500 can also continuously update the locations of the unauthorized users based on the location data from the sensors 1001 and the presence data from the camera 1300.

In one embodiment, the method can be implemented when an occupant crosses a boundary into an environment. The environment can be a designated area or an enclosed space. For example, the environment can be the interior of a building or an outdoor field. In one example, the environment can be a structure such as a train car. The boundary can be physically or virtually defined to separate the environment of interest from the surrounding area. A boundary can be, for example, a perimeter surrounding the environment. For example, the perimeter can be a physical fence around an enclosed area or the walls of an indoor structure. In the example of a train car environment, the boundary can be the physical car structure (or a specified area within the car) or can be a virtual boundary between the platform and the train track. In one example, the perimeter can be defined by a geofence.

According to some examples, a boundary can be a designated location or area within or near the environment. For example, an entrance to a venue can be a boundary. In one embodiment, the boundary can be defined by at least one coordinate, such as a longitude and latitude. In one embodiment, the boundary can be defined by a structure such as a doorway or a threshold. In one embodiment, sensors such as the sensors 1001, 1002, 100n of FIG. 1 can be placed along the boundary. The sensors 1001 can detect when an occupant enters the environment and can request and/or transmit the necessary data for authorizing the occupant. For example, an occupant can enter a building through a door. Sensors can be placed at or around the doorway to detect when the occupant enters the environment through the door. According to one embodiment, the sensors 1001 can detect when occupants enter a designated area within the environment. For example, sensors 1001 can be located at or around seats in a venue. Thus, the presence and location of an occupant can be detected when the occupant sits in a seat. In one example, the location of the occupant can include their seat number. In one embodiment, the method can be implemented when occupants are not stationary or assigned to a fixed location. For example, in a concert venue with standing room, occupants are free to move throughout the venue. The method can be used to locate and authorize occupants in motion and track the movement of the occupants.

According to some embodiments, an occupant can be authorized based on occupant credentials such as a ticket, a membership, a security clearance, a permission, a registration, etc. In one embodiment, the occupant credentials can be stored on or accessed by a user device being carried by the occupant, such as the user device 1100 of FIG. 1. According to one example, the user device 1100 can be configured to store or access a ticket in a digital wallet or in an application such as a ticketing service application. The digital ticket can include a seat number or designated area of the environment if applicable. In one embodiment, the digital ticket can include restrictions such as areas where the occupant is not allowed to go or a time window during which the occupant can be in the environment. In one embodiment, the occupant credentials can include additional identifying information related to the occupant. The identifying information can include, for example, information about the user device 1100 being used by the occupant or information related to a user account associated with the occupant. The identifying information can be used to positively identify the occupant in an environment. In one embodiment, the identifying information can include information from more than one source. For example, the digital ticket can be provided by a first application on the user device 1100. An identification card or payment card can be stored on a second application on the user device 1100. The identification card or payment card may include identifying information that can be used in addition to the occupant credentials.

The occupant credentials can be transmitted from the user device 1100 to the server 1500. The server 1500 can be, for example, a cloud-based server. In one embodiment, the server 1500 can be in communication with a fleet of transceiver devices, e.g., the sensors 1001, 1002, 100n, via a communication network. In one embodiment, the transceiver device can be a user device such as the administrative device 1101. The transceiver devices can be configured to read data from user devices and transmit the data to the server 1500. In one embodiment, the server 1500 can also be in communication with the user device 1100 via a communication network. For example, the server 1500 can transmit a request for occupant credentials directly to a user device 1100. The user device 1100 can transmit the occupant credentials to the server 1500 or to a transceiver device in response to the request from the server 1500. In one embodiment, the user device can transmit the occupant credentials to a transceiver device in response to a request from the transceiver device. The transceiver device can then transmit the occupant credentials to the server 1500. According to one example, the user device 1100 can access an application associated with the server 1500. The server 1500 can transmit requests to the user device via the application. The application can store or access the occupant credentials and other information needed to authorize the occupant. In one embodiment, the application can be configured to access a digital wallet. According to one implementation, the server 1500 can be accessed by an application programming interface (API).

In one embodiment, the occupant credentials can be read from the user device 1100 by a device such as a sensor 1001 using a wireless communication protocol such as UWB or BLE. UWB signals can be used to transmit data between devices. Advantageously, the UWB protocol can be used to transmit data using low-power signals over a wide frequency bandwidth and can thus avoid interference from narrower band signal protocols. In addition, data can be transmitted at a high data rate over the UWB spectrum, which can be advantageous for requesting and receiving occupant credentials quickly in a crowded area where occupants are in motion. UWB and BLE signals can also be used to locate the user device 1100, as will be described in further detail herein. Particularly, UWB signals can be used to obtain a precise and secure location of a user device 1100 relative to the sensor 1001. BLE is an industry standard for wireless connectivity and can also be used for data transfer. In one embodiment, the server 1500 can communicate with the user device 1100 via a communication network and request the occupant credentials from the user device 1100. Advantageously, most electronic devices, including smartphones, tablets, computers, and wearables (e.g., smartwatches) equipped with wireless communication capabilities, can transmit and receive data through UWB and BLE protocols.

In one embodiment, a sensor such as the sensors 1001, 1002, 100n can transmit a request for occupant credentials to the user device 1100 when the user device 1100 is in proximity to the sensor 1001. The user device 1100 can transmit the occupant credentials to the sensor 1001 in response to the request. In one embodiment, the sensor 1001 can be a UWB or BLE beacon. In one embodiment, the sensor 1001 can be an electronic device such as a phone or a tablet. The sensor 1001 can be a transceiver device in that the sensor 1001 is configured to receive data (the occupant credentials) from the user device 1100 and transmit data (the occupant credentials) to the server 1500. In one embodiment, the sensor 1001 can receive the occupant credentials from the user device 1100 via a first communication protocol (e.g., UWB or BLE) and transmit the occupant credentials to the server 1500 via a second communication protocol, such as over a communication network. In one embodiment, the request and transmission of the occupant credentials can be automatic, without requiring input from a user. In some embodiments, the user device 1100 can request a permission from the user before transmitting the occupant credentials to the sensor 1001. In one embodiment, the sensor 1001 can include a contactless sensor such as a near-field communication (NFC) reader or a radiofrequency identification (RFID) reader. The reader can automatically read the occupant credentials when the user device 1100 is within a certain proximity to the sensor 1001. According to one embodiment, the reader can read or scan an image being displayed by the user device, such as a code, as an occupant credential. The sensor 1001 can be manned or unmanned. The sensor 1001 can be automatic or can be manually activated to read the occupant credentials.

According to one embodiment, the server 1500 can generate, store, and access occupant records for an environment. The occupant records can include, for example, occupant credentials, verification of the occupant credentials, an occupant location, and additional occupant information such as identifying information. In one embodiment, the occupant records can be used to authorize and identify an occupant in an environment but may not expose the occupant's legal identity. In one embodiment, the server 1500 can transmit data to different user devices. For example, user devices can be used by employees, administrators, security guards, or similar personnel in the environment. An example of such user device can be administrative device 1101 in FIG. 3. The server 1500 can transmit occupant records for all occupants in an environment to an employee's user device 1101. The employee's user device 1101 can be designated as an employee device based on an employee account or an administrative application running on the employee device. The employee's user device 1101 can access the occupant records to enable local monitoring of the environment.

In one embodiment, the server 1500 can transmit data to and receive data from a second networked device in order to verify the occupant credentials. For example, the server 1500 can transmit the occupant credentials to an access server 360. The access server 360 can store access data for the environment. The access data can include, for example, authorized occupant credentials, unique identifiers (e.g., serial numbers, encoded data), or occupant information (e.g., user accounts). The access server 360 can transmit a verification to the server 1500. The verification can be a confirmation that the occupant is authorized to be in the environment or can be an indication that the occupant is not authorized to be in the environment.

As an example, the access data can include a list of valid ticket serial numbers for an event. The server 1500 can receive the occupant credentials including a ticket serial number. The server 1500 can transmit the serial number to the access server 360 and can receive verification that the serial number is on the list of valid serial numbers. The automated process of reading the occupant credentials and verifying the occupant credentials reduces the possibility of validating fraudulent credentials. In one example, the access data can include an occupant identifier, such as a user account, and a permission indicating whether the occupant associated with the identifier is allowed to be in the environment. The server 1500 can receive the occupant credentials including the occupant identifier. The server 1500 can transmit the occupant identifier to the access server 360 and can receive verification that the occupant is permitted to be in the environment.

In some embodiments, the access data can include additional information or conditions for authorization such as a designated seat or a date and time of entry. A server, such as the server 1500, can compare the occupant credentials and the location of the occupant with the access data to verify that the occupant is authorized to be in their location. If the occupant credentials and the additional occupant information match the access data, the occupant can be authorized.

In some embodiments, the server 1500 can store the access data in addition to or in place of the access server 360. The server 1500 can compare the occupant credentials to the access data stored in the server 1500 in order to verify the occupant credentials. In one embodiment, the server 1500 can implement a protocol to prevent reuse of occupant credentials. For example, occupants can attempt to share a single ticket by transferring it between devices. In one embodiment, the server 1500 can compare a new occupant credential with previously verified occupant credentials to verify that the new occupant credential is unique and has not been used before.

According to one embodiment, the access data or the occupant record can be modified when an occupant credential is verified to prevent verification of the same occupant credential again at a later point. For example, the occupant credential can be removed from the access data after being verified. In one embodiment, the occupant record can be updated by the server 1500 to indicate that an occupant has been authorized. As an exemplary implementation, a flag or indicator can be included in the occupant record to indicate that the occupant is authorized. The flag can be used to prevent redundant data transmission or processing to re-verify occupants. For example, when the occupant has already been authorized, the sensors and/or the server 1500 will no longer transmit requests for occupant credentials to the occupant's user device 1100. In one embodiment, the occupant can still be localized and movement of the authorized and unauthorized occupants can be monitored and displayed on the map. In one embodiment, the server 1500 can generate a visualization or listing of authorized occupants and a visualization or listing of unauthorized occupants. According to one example, the listing can include a whitelist of authorized occupants. The grouping and indication of occupants based on their authorization can enable further actions to be implemented for one group of occupants. In one embodiment, the server 1500 can transmit the listings to a user device such as a device 1101 used by security personnel in an environment.

In one embodiment, a presence of occupants in an environment can be detected using data from at least one imaging sensor, the at least one imaging sensor including, but not limited to, an image capture device, an infrared (IR) thermal sensor, a motion sensor. For example, the at least one imaging sensor can be the camera 1300 of FIG. 1 and can capture an image of a venue. Various methods of automated image analysis can be used to determine a number of occupants in the image of the venue. Methods of automated image analysis can include, for example, image recognition, semantic segmentation, edge detection, pattern detection, object detection, image classification, and/or feature recognition. Examples of computing systems and techniques used for computer vision can include, but are not limited to, artificial neural networks (ANNs), generative adversarial networks (GANs), convolutional neural networks (CNNs), thresholding, and support vector machines (SVMs). In one embodiment, the server 1500 can perform the automated image analysis in order to determine the number of occupants in the image. In one embodiment, the camera 1300 can be connected to or in communication with a device configured to perform the image analysis. The device can be, for example, a processor or a networked device such as a server. In one embodiment, the camera 1300 can capture a video feed of the venue. The number of occupants in the venue can be determined and updated for each frame of the video feed or for a selection of frames from the video feed. In one embodiment, more than one image of the environment can be used to determine a number of occupants. The images can be stitched together for an accurate count. In one embodiment, the location of the camera 1300 can be used to estimate a location in the environment where the occupant is present. For example, it can be known that the field of view of the camera 1300 covers a designated area in the environment. The occupants captured by the camera image are thus within the designated area. According to one example, the server 1500 can determine that there are a number of occupants in an area of fixed square footage in the venue based on an image of the area. The number of occupants identified in the area can be compared with occupant credential data and/or occupant location data to determine whether each of the occupants in the area possess a detected user device 1100 with occupant credentials. In one embodiment, additional features related to the occupants can be identified based on the image. The presence of occupants in the image data can be stored by the server 1500 and used to authorize occupants. In one embodiment, images from the camera 1300 can be stored by the server 1500 as part of an occupant record. In one embodiment, the images from the camera 1300 can be processed and analyzed by the server 1500 or the camera 1300 to identify a number of occupants without storing the images. Processing the images to extract occupant information without storing the images can protect the privacy of occupants in the area. In addition, information such as a presence or number of occupants can be extracted by the server 1500 or the camera 1300 without storing or determining identifying information about the occupants such as a name or appearance.

According to some embodiments, the location of an occupant can be determined by localizing the occupant's user device 1100. The user device 1100 can be localized in indoor and outdoor environments. In one embodiment, a location of the user device 1100 can be determined using a navigation system such as the Global Positioning System (GPS) or other satellite navigation system. In some embodiments, the user device can be localized using communication protocols such as ultra-wideband (UWB) technology or Bluetooth (BLE) technology. Advantageously, the same communication protocols (e.g., UWB and BLE) can be used to read the occupant credentials and to localize the user device. The same sensors, e.g., sensors 1001, 1002, 100*n* of FIG. 1, can be used for both functions. UWB and BLE technologies can be used for accurate indoor positioning. A transmitting device can wirelessly transmit a pattern of signals within a frequency spectrum to a receiving device. The received signals can be analyzed to pinpoint the location of the transmitting device and/or the receiving device based on the time that it takes for a transmitted signal to be received and the pattern of the received signals. In one embodiment, the transmitting device can be the user device 1100 carried by the occupant, and the receiving device can be the sensors 1001, 1002, 100*n* described herein. In one embodiment, the receiving device can be an anchor or sensor in the environment with a known location such as the sensors 1001, 1002, 100*n*. In one embodiment, two-way ranging can occur between transmitting devices and receiving devices such that each device can act as a transceiver. The analysis of the received signals to localize the user device can be performed by a sensor 1001 or by the server 1500. The frequency spectrum and the signal pattern can vary based on the localization protocol. In one embodiment, more than one localization protocol can be implemented at the same time. For example, a first sensor 1001 can be a UWB sensor and can localize a user device using UWB signals. A second sensor 1002 can be a BLE sensor and can localize the user device using BLE signals. The server 1500 can combine localization data from the first sensor 1001 and the second sensor 1002 in order to improve localization accuracy.

Additional or alternative sensors can be used to determine or confirm the location of the occupant. According to one example, a pressure sensor can be located in or on a seat. Readings from the pressure sensor can indicate that a seat is occupied. The readings can be combined with image data and/or location data to determine whether an occupant is in the seat.

In some examples, the user device can be localized via UWB or via BLE in parallel with the reading of the occupant credentials via UWB or via BLE. In one embodiment, a first sensor 1001 can receive the localization signals from the user device and a second sensor 1002 can receive the occupant credentials from the user device. The first sensor 1001 and the second sensor 1002 can both be in communication, via a communication network, with the server 1500. In one embodiment, the first sensor 1001 and the second sensor 1002 can be in communication, via a communication network or protocol, with each other. In one embodiment, the occupant credentials can be read and the user device 1100 can be localized by the same sensor or sensors. The occupant credentials and location data can be transmitted by the sensor to the server 1500. According to one embodiment, the occupant credentials and the location data from the same user device can be associated with each other in the transmission from the sensor to the server 1500.

In one embodiment, the server 1500 can cross-reference the location of an occupant against a mapping of the environment such as a floor plan, blueprint, or seating chart. The location of the occupant can be determined by the server 1500 as a placement within the environment. For example, the location can be a seat number, a designated area in the environment, a level or floor, a room, or other enclosed space within the environment. In one embodiment, the location of the occupant can be relative to structures or objects in the environment. For example, the location can include a proximity to an entrance or a sensor.

In one embodiment, the server 1500 can associate the location data with the image data and occupant presence detected by the imaging sensor. For example, an image of the occupant and/or the occupant's surroundings can be associated with the location of the occupant and the occupant credentials in the occupant record. The server 1500 can analyze the image to properly associate an image in the occupant record. For example, the image can include identifiable structures or other features of the environment that can be used to estimate the location of the occupant. The server 1500 can verify that the real location of the occupant, as determined by the sensors, is near the identifiable structures or features of the environment to confirm that the image is an image of the occupant. The server 1500 can then associate the image of the occupant with the real location and occupant credentials in the occupant record.

In one embodiment, the server 1500 can generate a map as a visualization of occupants in the environment. The map of occupants can be generated for indoor and outdoor environments. In one embodiment, the map can also indicate whether the occupants are authorized or unauthorized based on the occupant credentials. The map can be based on an existing map or layout of the environment. For example, the map can be a blueprint of a room indicating the location of occupants in the room. In one embodiment, the map can include image data captured by a camera. For example, an image of each occupant in the room can be displayed on the map to indicate where the occupant is located. In one example, the map can be an image of the room captured by a camera and can include an authorization of each occupant visible in the image. According to one example, the map can be a map of unauthorized occupants or a map of authorized occupants. In one embodiment, the server 1500 can transmit the map to at least one user device. The user device can be, for example, a device used by a controller, security guard, or other authoritative figure in the environment, such as the administrative device 1101 of FIG. 3. In one embodiment, the map can be updated if the location of an occupant changes.

A number of unregistered or unauthorized occupants in the environment can be determined by taking the difference between the total number of occupants and the number of authorized occupants. The total number of occupants can be determined using the image data and/or location data. The number of authorized occupants can be determined based on the verification of the occupant credentials. The unauthorized occupants can then be identified as those with unverified occupant credentials. Unverified occupant credentials can include falsified occupant credentials or credentials that do not match the access data. For example, an occupant can have a train ticket but can be seated in a seat that does not match the seat of the train ticket. The occupant thus is not authorized to be in their present seat. Unauthorized occupants can also include occupants whose occupant credentials could not be read or transmitted to the server 1500. For example, an occupant's user device is inaccessible or does not have any occupant credentials that can be transmitted to a sensor. According to one example, the occupant's user device can have a security permission that prevents a sensor 1001 from reading the occupant credentials from the user device. In one embodiment, the server 1500 can generate a listing of unauthorized occupants. The listing can include, for example, identifying information about the unauthorized occupants from the occupant record such as images, location data, or user device data.

According to some embodiments, the server 1500 can transmit a request for additional information about an unauthorized occupant. In one embodiment, the request can be transmitted to a device, such as the user device 1100 of FIG. 1. The user device can be used by a security guard or other authoritative figure in the environment. The request can include identifying information about the unauthorized occupant, such as a location or an image of the occupant, to aid the controller in finding the occupant in the environment. The request can prompt the input of additional information into the user device to be transmitted back to the server 1500 or the access server 360. In one embodiment, the additional information can include an image, e.g., an image of the occupant, the occupant's user device, or a physical object such as a printed ticket. According to one embodiment, the request can be transmitted by the server 1500 directly to the occupant's user device 1100. The additional information can then be provided by the occupant to the server 1500 directly without requiring the intervention of an authoritative figure or additional devices. The additional information can be used to supplement the identifying information or occupant credentials. For example, the additional information can include a proof of purchase for a ticket. In one embodiment, the additional information can be used to override the initial verification of the occupant credentials. The occupant can then be authorized to enter the environment. In one embodiment, the server 1500 can use the additional to modify the access data and/or the occupant record.

According to one embodiment, an authorization can be contingent on a condition such as a time or a location. For example, the server 1500 can receive occupant credentials in the form of an entrance ticket that is valid for a window of time. The occupant can be authorized for the designated window of time. After the window of time has elapsed, the occupant authorization can expire and the server 1500 or a sensor 1001 can re-request occupant credentials from the occupant. The expiration and other conditions of authorization can be stored in the occupant record. If the occupant does not have an additional ticket for later time windows, the occupant remains unauthorized. If the occupant does have an additional ticket, the occupant can be re-authorized. According to one example, an occupant can be authorized for a first level of a two-story venue. If the occupant is detected on the second level of the venue, a request can be sent for additional or updated occupant credentials because the occupant is not authorized to be on the second level. The occupant can be detected on the second level in an image or based on the location of the occupant's user device 1100.

In some examples, the map generated by the server 1500 can indicate whether occupants are in a designated area within the environment or in a "common" area. For example, a train car can have a vestibule and a seated area, wherein passengers entering the train can stay in the vestibule for some time rather than taking their seats. According to one embodiment, a camera 1300 can detect a number of occupants in the vestibule of a train. The server 1500 can compare the number of occupants in the vestibule of the train with the number of unoccupied seats on the train car. If there are more passengers on the train car than the number of unoccupied seats, the server 1500 can transmit an alert to a user device such as an administrative device 1101 that there are unauthorized passengers on the train car. In one embodiment, a device, such as a sensor 1001, can read the occupant credentials of a passenger in the vestibule and identify that the passenger is authorized for a seat in the car. In one embodiment, if the passenger does not proceed to their seat or other designated location, the server 1500 can transmit an alert to a user device 1100 to inform the passenger to take their seat. The user device can be a user device of the passenger or can be a user device of a train conductor. The passenger can then be authorized once they are in the correct seat. If a second passenger is detected to be located in the seat of the first passenger, the server 1500 can transmit an alert to a user device 1100 that the second passenger is in the wrong seat. The user device 1100 can be a user device of the second passenger to inform the passenger that they are in an unauthorized seat. The alert may enable the passenger to correct the error without additional intervention.

In one embodiment, the time at which occupants are authorized can depend on the environment and the occupant credentials. For example, it can be expected that occupants may enter a concert hall but may not take their seats until shortly before a concert is scheduled to begin. In one embodiment, the sensors can localize the occupants and the server 1500 can authorize the occupants at or right before the concert is scheduled to begin. In one embodiment, the server 1500 can determine when an occupant has taken their seat, e.g., when the occupant's location corresponds to a seat and when the occupant's location has not changed for a period of time. The server 1500 can then authorize the occupant and determine whether they are in the correct seat based on the occupant credentials.

According to an exemplary embodiment, a passenger on a train can carry a user device 1101 with a digital train ticket loaded on the user device. The digital ticket can be accessed via a digital wallet or can be accessed by an application on the user device. When the passenger boards the train, a UWB sensor positioned near the entrance to the train car can detect the user device and can transmit a request to the user device for the digital ticket. The UWB sensor can be an exemplary sensor 1001 of FIG. 1. The user device can transmit the digital ticket to the same UWB sensor or a different UWB sensor. For example, the passenger can be in motion, and the user device can transmit the digital ticket to a nearest UWB sensor via ultra-wide band signals. The digital ticket can include a train time and a designated seat on the train. The UWB sensor can transmit the data from the digital ticket to a server, such as the server 1500 of FIG. 1. The UWB sensor can also localize the user device and transmit the location of the user device to the server 1500 when the passenger enters the train. The server 1500 can generate or update a passenger record with the digital train ticket and the present location of the passenger's user device. The server 1500 can transmit data from the digital train ticket to a second server, such as the access server 360, and the second server can verify that the digital train ticket is an authentic ticket for the train that the passenger has boarded. The verification can be transmitted from the second server to the server 1500. As the passenger moves through the train car, they pass additional UWB sensors positioned throughout the car. The UWB sensors can continue to localize the user device 1100 via ultra-wide band signals from the user device and transmit the location data to the server. The server can update the passenger record to track the movement of the passenger over time. When the passenger sits in a seat, a camera 1300 that is directed at the seat can capture an image of the passenger in the seat. The image can be analyzed to identify that there is a passenger in the seat. The camera 1300 can then transmit a confirmation that there is a passenger in the seat to the server. A UWB sensor can localize the user device at the seat and transmit the location data to the server. The server can use the location data and the camera data in combination with the verified digital ticket to authorize that the passenger is in the correct seat. In one embodiment, the server can transmit a notification to a conductor's user device to indicate that the passenger is authorized and that no further information is needed.

According to one example, the methods described herein can be implemented in an event venue. The event venue can have an open floor plan where attendees can walk around freely. Bluetooth sensors 1001, 1002, 100n can be positioned at entry and exit points as well as throughout the venue. When an attendee carrying a user device 1100 walks into the venue, a Bluetooth sensor 1001 positioned near the entrance can detect the user device 1100 over a Bluetooth connection and can request a ticket for the event. The user device 1100 can access a digital ticket purchased by the attendee in a ticketing application and can transmit the digital ticket to the Bluetooth sensor 1001. The user device 1100 can also transmit a location signal to the Bluetooth sensor 1001. The Bluetooth sensor 1001 can localize the user device 1100 based on the location signal. The Bluetooth sensor 1001 can then transmit the digital ticket and the location of the user device 1100 to a server 1500. A camera 1300 located at the entrance can capture an image of the entrance and identify, using image analysis, the presence of an attendee in the image. The image can also be transmitted to the server 1500. The server 1500 can request access data from an access server 360 to verify the digital ticket. If the digital ticket cannot be verified, the server 1500 can record that the attendee is unauthorized and transmit an alert to a security device 1101 indicating that the attendee does not have a valid ticket. The server 1500 can also add the attendee to a list of unauthorized users. The alert can include the image of the attendee and the location of the attendee, as was determined by the Bluetooth sensors. The attendee can be easily found and identified using the image and location data transmitted to the security device 1101. Additional information can then be requested from the attendee. In one embodiment, the attendee may have a print copy of a ticket with a verification number. The verification number can be transmitted to the server 1500 via the security device. If the verification number can be verified by the server 1500, the server 1500 can authorize the attendee to remain in the event venue. In one embodiment, the attendee can be removed from the list of unauthorized users previously generated by the server.

According to one example, the methods of the present disclosure can be implemented in an indoor concert hall divided into different sections, such as a general admission section, a VIP section, a balcony, etc. UWB sensors 1001, 1002, 100n positioned at entrances into the concert hall can detect when a concertgoer carrying a user device 1100 enters the hall. The concertgoer is designated as an occupant once they enter the hall. One or more nearest UWB sensors can request and receive occupant credentials from the user device 1100. The occupant credentials can include, for example, a ticket to a concert stored in a digital wallet on the user device. The ticket can include the concert date and time as well as a designated section of the hall, such as the general admission section. The UWB sensors can transmit the occupant credentials to a server 1500. The server 1500 can generate an occupant record to store the occupant credentials. The occupant record can include additional identifying information related to the occupant such as a unique identifier, a user account, or user device information. The additional information can also be transmitted to the server 1500 by the UWB sensors. The server 1500 can transmit the occupant credentials to an access server 360 to verify the credentials. The access server 360 can transmit a verification to the server 1500 in response to the credentials. The UWB sensors can localize the user device 1100 based on ultra-wideband signals that the sensors receive from the user device 1100. The location of the user device 1100 can be updated as the occupant moves through the hall. The UWB sensors can continuously transmit the location of the user device 1100 to the server 1500. Cameras 1300 located throughout the hall can also capture images or a video feed of the hall. Image detection can be analyzed to identify occupants in the images. In one embodiment, the server 1500 can identify the occupant in the image by comparing the image data with the location of the occupant as has been determined by the UWB sensors. If the location where the image is captured and the location of the occupant are the same or within an acceptable margin of error, the server 1500 can positively identify the occupant in the image and can associate the image of the occupant with the occupant record. In one embodiment, the server 1500 can compare the location of the occupant with a floorplan of the hall to determine a section where the occupant is located. The server 1500 can authorize the occupant while the occupant is in the general admission section of the hall. One or more UWB sensors can determine when the occupant leaves the general admission section and enters a different section such as the VIP section. The location of the occupant can be continuously transmitted to the server 1500. The server 1500 can determine from the digital ticket that the occupant is not authorized to enter the VIP section. The server 1500 can then transmit an alert to a user device being used by a security guard. The alert can include information from the occupant record such as an image of the occupant and the occupant's present location. The alert can indicate that the occupant is unauthorized to be in the VIP section. The security guard can then approach the occupant and ask for further credentials or for the occupant to move to an authorized location.

Advantageously, the methods of the present disclosure enable the automated monitoring and management of any enclosed area. The server 1500 can communicate with a fleet of sensors and imaging devices in order to capture data from each occupant in the area. The data can be used to authorize the occupants and monitor their location over time to maintain an up-to-date authorization. The methods described herein reduce the need for on-the-ground authorization of each individual occupant, which can create a significant bottleneck for any areas with restricted entry, including large arenas or places with assigned seats.

Embodiments of the subject matter and the functional operations described in this specification can be implemented by digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus, such as the networked device or server 1500, the sensors 1001, 1002 100$n$, the user devices 1100, and the like. The computer storage medium can be a machine-readable storage device, a machine-readable storage substrate, a random or serial access memory device, or a combination of one or more of them.

The term "data processing apparatus" refers to data processing hardware and may encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both, or any other kind of central processing unit. Generally, a CPU will receive instructions and data from a read-only memory or a random access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients (user devices) and servers. A client and server are generally remote from each other and typically interact through a communication network. The relationship of client and server arises by virtue of computer programs running on the respective computers and having a client-server relationship to each other. In an embodiment, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 4:
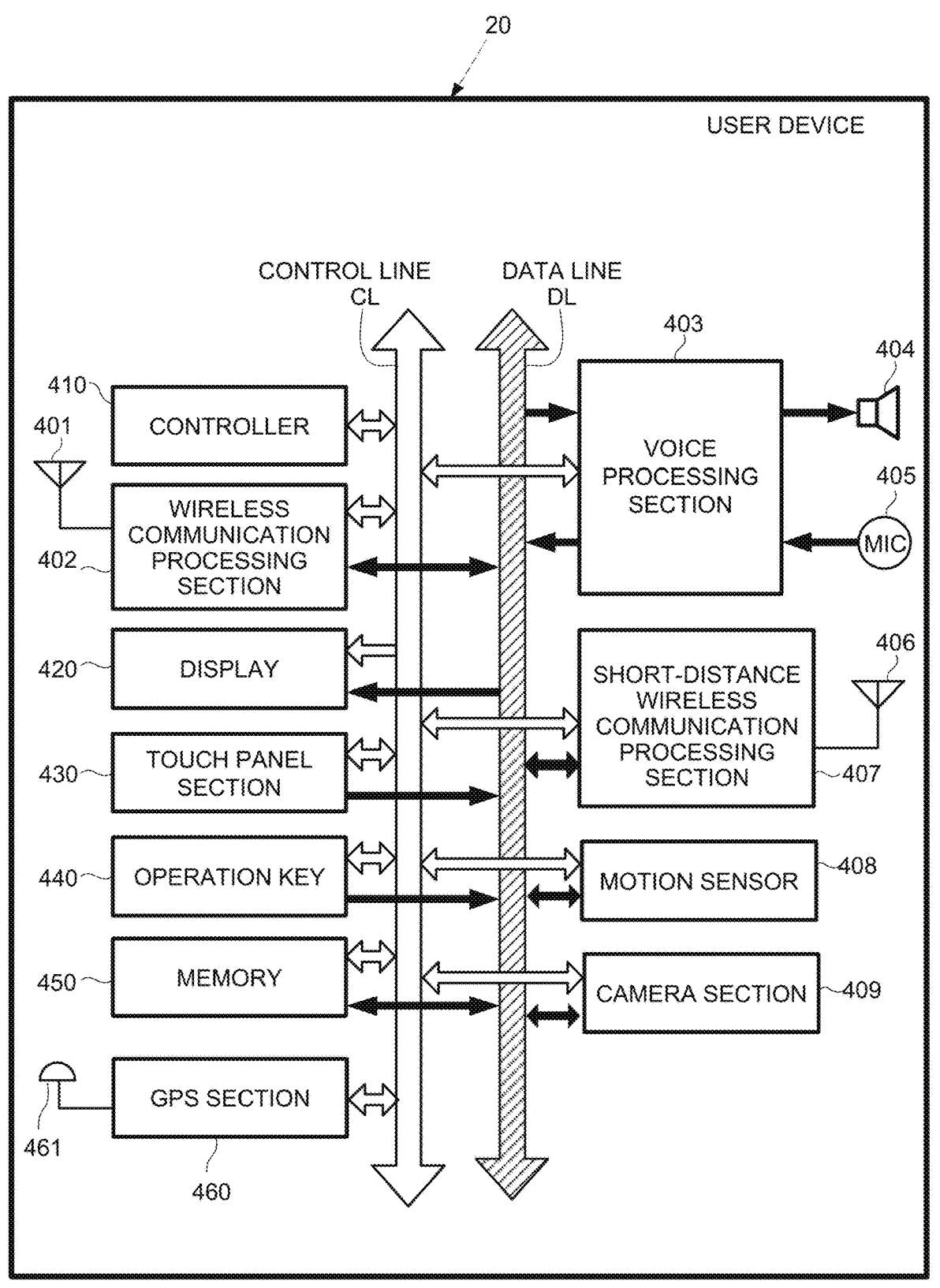
FIG. 4 is a schematic of a user device for performing a method, according to an exemplary embodiment of the present disclosure.

Electronic user device 20 shown in FIG. 4 can be an example of one or more of the devices described herein, including the user device 1100 or any of the sensors 1001, 1002, 100n. In an embodiment, the electronic user device 20 may be a smartphone. However, the skilled artisan will appreciate that the features described herein may be adapted to be implemented on other devices (e.g., a laptop, a tablet, a server, an e-reader, a camera, a navigation device, etc.). The exemplary user device 20 of FIG. 4 includes processing circuitry, as discussed above. The processing circuitry includes one or more of the elements discussed next with reference to FIG. 4. The electronic user device 20 may include other components not explicitly illustrated in FIG. 4 such as a CPU, GPU, frame buffer, etc. The electronic user device 20 includes a controller 410 and a wireless communication processor 402 connected to an antenna 401. A speaker 404 and a microphone 405 are connected to a voice processor 403.

The controller 410 may include one or more processors/processing circuitry (CPU, GPU, or other circuitry) and may control each element in the user device 20 to perform functions related to communication control, audio signal processing, graphics processing, control for the audio signal processing, still and moving image processing and control, and other kinds of signal processing. The controller 410 may perform these functions by executing instructions stored in a memory 450. Alternatively or in addition to the local storage of the memory 450, the functions may be executed using instructions stored on an external device accessed on a network or on a non-transitory computer readable medium.

The memory 450 includes but is not limited to Read Only Memory (ROM), Random Access Memory (RAM), or a memory array including a combination of volatile and non-volatile memory units. The memory 450 may be utilized as working memory by the controller 410 while executing the processes and algorithms of the present disclosure. Additionally, the memory 450 may be used for long-term storage, e.g., of image data and information related thereto.

The user device 20 includes a control line CL and data line DL as internal communication bus lines. Control data to/from the controller 410 may be transmitted through the control line CL. The data line DL may be used for transmission of voice data, displayed data, etc.

The antenna 401 transmits/receives electromagnetic wave signals between base stations for performing radio-based communication, such as the various forms of cellular telephone communication. The wireless communication processor 402 controls the communication performed between the user device 20 and other external devices via the antenna 401. For example, the wireless communication processor 402 may control communication between base stations for cellular phone communication.

The speaker 404 emits an audio signal corresponding to audio data supplied from the voice processor 403. The microphone 405 detects surrounding audio and converts the detected audio into an audio signal. The audio signal may then be output to the voice processor 403 for further processing. The voice processor 403 demodulates and/or decodes the audio data read from the memory 450 or audio data received by the wireless communication processor 402 and/or a short-distance wireless communication processor 407. Additionally, the voice processor 403 may decode audio signals obtained by the microphone 405.

The exemplary user device 20 may also include a display 420, a touch panel 430, an operation key 440, and a short-distance communication processor 407 connected to an antenna 406. The display 420 may be a Liquid Crystal Display (LCD), an organic electroluminescence display panel, or another display screen technology. In addition to displaying still and moving image data, the display 420 may display operational inputs, such as numbers or icons which may be used for control of the user device 20. The display 420 may additionally display a GUI for a user to control aspects of the user device 20 and/or other devices. Further, the display 420 may display characters and images received by the user device 20 and/or stored in the memory 450 or accessed from an external device on a network. For example, the user device 20 may access a network such as the Internet and display text and/or images transmitted from a Web server.

The touch panel 430 may include a physical touch panel display screen and a touch panel driver. The touch panel 430 may include one or more touch sensors for detecting an input operation on an operation surface of the touch panel display screen. The touch panel 430 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 430 may detect when the stylus approaches/contacts the operation surface of the touch panel display (similar to the case in which a finger is used for the touch operation).

In certain aspects of the present disclosure, the touch panel 430 may be disposed adjacent to the display 420 (e.g., laminated) or may be formed integrally with the display 420. For simplicity, the present disclosure assumes the touch panel 430 is formed integrally with the display 420 and therefore, examples discussed herein may describe touch operations being performed on the surface of the display 420 rather than the touch panel 430. However, the skilled artisan will appreciate that this is not limiting.

For simplicity, the present disclosure assumes the touch panel 430 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 430 may include transparent electrode touch sensors arranged in the X-Y direction on the surface of transparent sensor glass.

The touch panel driver may be included in the touch panel 430 for control processing related to the touch panel 430, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in an embodiment, the touch panel 430 may detect a position of a user's finger around an edge of the display panel 420 (e.g., gripping a protective case that surrounds the display/touch panel). Signals may be transmitted by the touch panel driver, e.g. in response to a detection of a touch operation, in response to a query from another element based on timed data exchange, etc.

The touch panel 430 and the display 420 may be surrounded by a protective casing, which may also enclose the other elements included in the user device 20. In an embodiment, a position of the user's fingers on the protective casing (but not directly on the surface of the display 420) may be detected by the touch panel 430 sensors. Accordingly, the controller 410 may perform display control processing described herein based on the detected position of the user's fingers gripping the casing. For example, an element in an interface may be moved to a new location within the interface (e.g., closer to one or more of the fingers) based on the detected finger position.

Further, in an embodiment, the controller 410 may be configured to detect which hand is holding the user device 20, based on the detected finger position. For example, the touch panel 430 sensors may detect fingers on the left side of the user device 20 (e.g., on an edge of the display 420 or on the protective casing), and detect a single finger on the right side of the user device 20. In this exemplary scenario, the controller 410 may determine that the user is holding the user device 20 with his/her right hand because the detected grip pattern corresponds to an expected pattern when the user device 20 is held only with the right hand.

The operation key 440 may include one or more buttons or similar external control elements, which may generate an operation signal based on a detected input by the user. In addition to outputs from the touch panel 430, these operation signals may be supplied to the controller 410 for performing related processing and control. In certain aspects of the present disclosure, the processing and/or functions associated with external buttons and the like may be performed by the controller 410 in response to an input operation on the touch panel 430 display screen rather than the external button, key, etc. In this way, external buttons on the user device 20 may be eliminated in lieu of performing inputs via touch operations, thereby improving watertightness.

The antenna 406 may transmit/receive electromagnetic wave signals to/from other external apparatuses, and the short-distance wireless communication processor 407 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 407.

The user device 20 may include a motion sensor 408. The motion sensor 408 may detect features of motion (i.e., one or more movements) of the user device 20. For example, the motion sensor 408 may include an accelerometer to detect acceleration, a gyroscope to detect angular velocity, a geomagnetic sensor to detect direction, a geo-location sensor to detect location, etc., or a combination thereof to detect motion of the user device 20. In an embodiment, the motion sensor 408 may generate a detection signal that includes data representing the detected motion. For example, the motion sensor 408 may determine a number of distinct movements in a motion (e.g., from start of the series of movements to the stop, within a predetermined time interval, etc.), a number of physical shocks on the user device 20 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 410, whereby further processing may be performed based on data included in the detection signal. The motion sensor 408 can work in conjunction with a Global Positioning System (GPS) section 460. The information of the present position detected by the GPS section 460 is transmitted to the controller 410. An antenna 461 is connected to the GPS section 460 for receiving and transmitting signals to and from a GPS satellite.

The user device 20 may include a camera section 409, which includes a lens and shutter for capturing photographs of the surroundings around the user device 20. In an embodiment, the camera section 409 captures surroundings of an opposite side of the user device 20 from the user. The images of the captured photographs can be displayed on the display panel 420. A memory section saves the captured photographs. The memory section may reside within the camera section 109 or it may be part of the memory 450. The camera section 409 can be a separate feature attached to the user device 20 or it can be a built-in camera feature.

Figure 5:
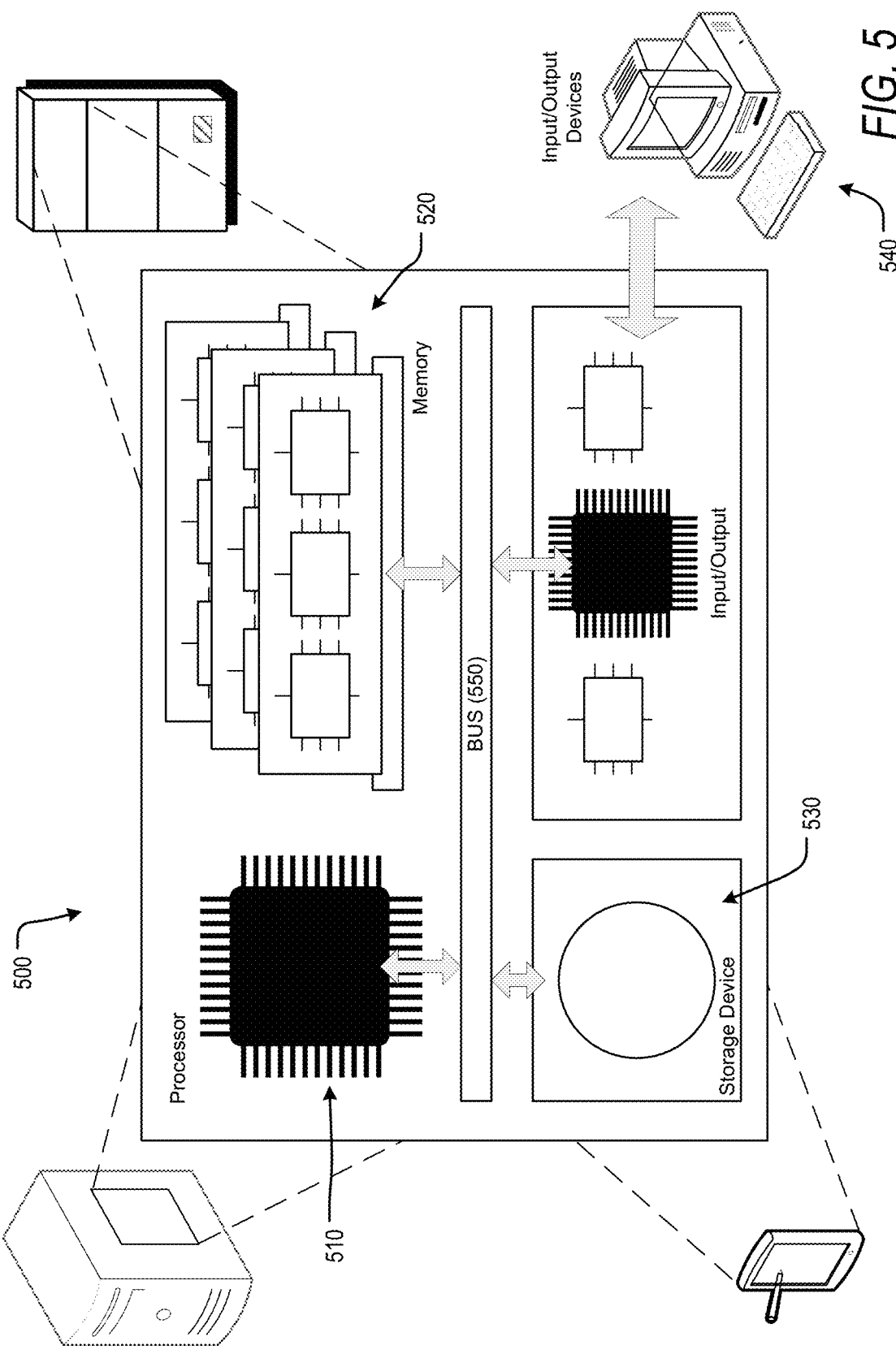
FIG. 5 is a schematic of a hardware system for performing a method, according to an exemplary embodiment of the present disclosure.

An example of a type of computer is shown in FIG. 5. The computer 500 can be used for the operations described in association with any of the computer-implement methods described previously, according to one implementation. For example, the computer 500 can be an example of a networked device such as the server 1500 including processing circuitry, as discussed herein. In some embodiments, the computer 500 can be an example of any of the sensors 1001, 1002, 100n and/or a user device 1100 in communication with the networked device via the network 1200. The processing circuitry includes one or more of the elements discussed next with reference to FIG. 5. In FIG. 5, the computer 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the computer 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the computer 500. In one implementation, the storage device 530 is a computer-readable medium. In various different implementations, the storage device 530 may be a floppy disk device, a hard disk device, an optical disk device, or a tape device.

The input/output device 540 provides input/output operations for the computer 500. In one implementation, the input/output device 540 includes a keyboard and/or pointing device. In another implementation, the input/output device 540 includes a display unit for displaying graphical user interfaces.

Figure 6:
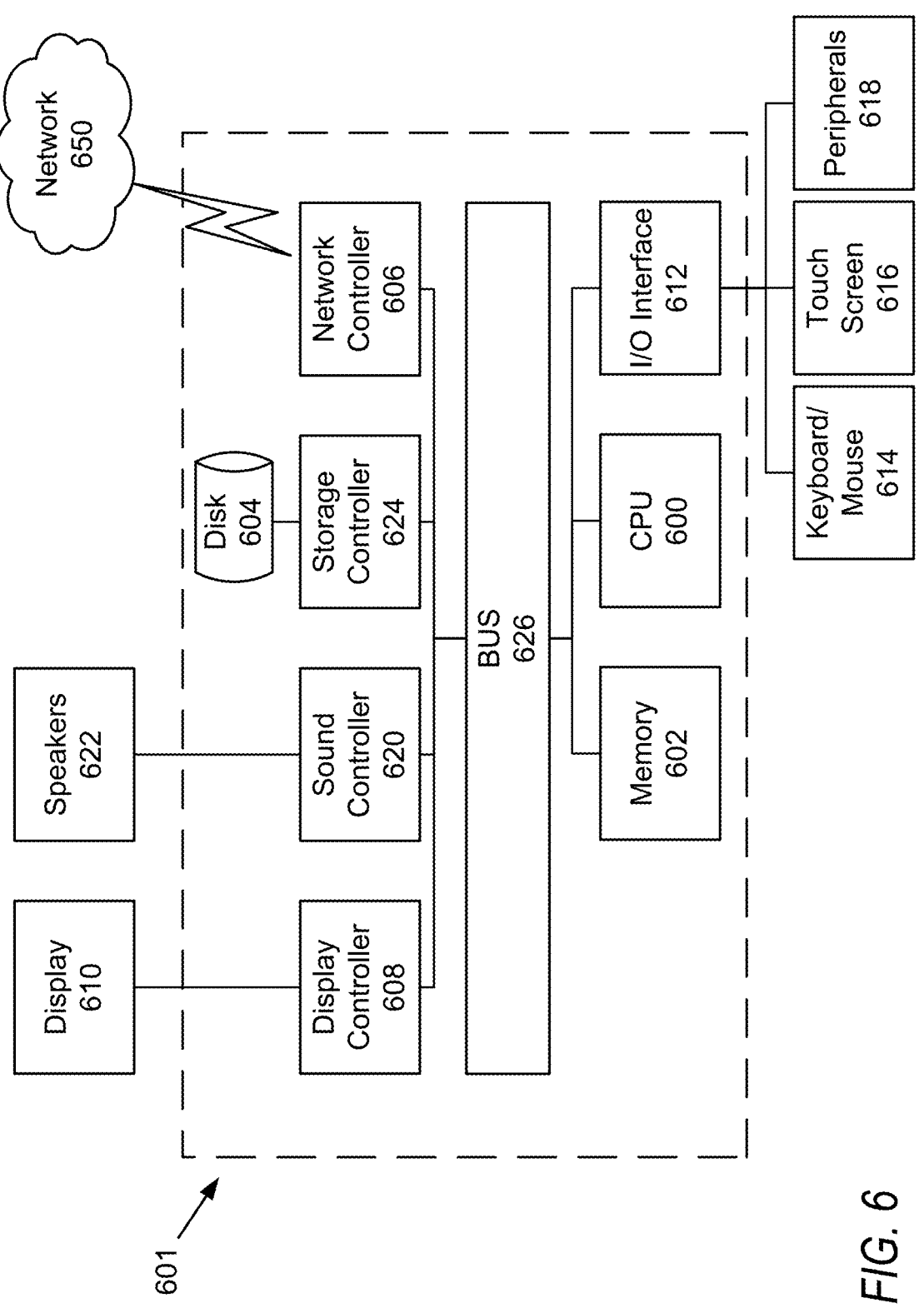
FIG. 6 is a schematic of a hardware configuration of a device for performing a method, according to an exemplary embodiment of the present disclosure.

Next, a hardware description of a device 601 according to exemplary embodiments is described with reference to FIG. 6. In FIG. 6, the device 601, which can be any of the above described devices, including the server 1500, any of the sensors 1001, 1002, 100n, the user device 1100, includes processing circuitry. The processing circuitry includes one or more of the elements discussed next with reference to FIG. 6. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device 601 communicates, such as a server or computer.

Further, the claimed advancements may be provided as a utility application, background daemon, or component of an operating system, or combination thereof, executing in conjunction with CPU 600 and an operating system such as Microsoft Windows, UNIX, Solaris, LINUX, Apple MAC-OS and other systems known to those skilled in the art.

The hardware elements in order to achieve the device 601 may be realized by various circuitry elements, known to those skilled in the art. For example, CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the processes described above.

The device 601 in FIG. 6 also includes a network controller 606, such as an Intel Ethernet PRO network interface card from Intel Corporation of America, for interfacing with network 650. and to communicate with the other devices. As can be appreciated, the network 650 can be a public network, such as the Internet, or a private network such as an LAN or WAN network, or any combination thereof and can also include PSTN or ISDN sub-networks. The network 650 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device 601 further includes a display controller 608, such as a NVIDIA GeForce GTX or Quadro graphics adaptor from NVIDIA Corporation of America for interfacing with display 610, such as an LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners.

A sound controller 620 is also provided in the device 601 to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the device 601. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Embodiments of the present disclosure may also be set forth in the following parentheticals.

(1) A method for automated authorization within a restricted perimeter, comprising receiving, via processing circuitry, a digital credential of a first device, a location of the first device within the restricted perimeter, and an image of an area within the restricted perimeter; verifying, via the processing circuitry, the digital credential; identifying, via the processing circuitry, a presence of an occupant in the image; associating, via the processing circuitry, the occupant with the digital credential and the location of the first device based on the image; and authorizing, via the processing circuitry, the occupant based on the digital credential and the location of the first device.

(2) The method of (1), wherein the digital credential is received from the first device using ultra wide band (UWB) communication and the first device is localized using UWB communication.

(3) The method of (1) to (2), further comprising generating a visualization of authorized occupants and unauthorized occupants within the restricted perimeter.

(4) The method of (1) to (3), further comprising transmitting an authorization of the occupant and the location of the first device to a second device.

(5) The method of (1) to (4) further comprising, prior to the receiving, transmitting to the first device, via the processing circuitry, an instruction for the first device to acquire the digital credential to be received by the processing circuitry.

(6) The method of (1) to (5), further comprising updating the location of the first device after authorizing the occupant.

(7) A device comprising processing circuitry configured to receive a digital credential of a first user device, a location of the first user device within the restricted perimeter, and an image of an area within a restricted perimeter, verify the digital credential, identify a presence of an occupant in the image, associate the occupant with the digital credential and the location of the first user device based on the image, and authorize the occupant based on the digital credential and the location of the first user device.

(8) The device of (7), wherein the digital credential is received from the first user device using UWB communication and the first user device is localized using UWB communication.

(9) The device of (7) to (8), wherein the processing circuitry is configured to receive the digital credential and the location of the first user device from a second user device via a communication network.

(10) The device of (7) to (9), wherein the processing circuitry is configured to generate a visualization of authorized occupants and unauthorized occupants within the restricted perimeter.

(11) The device of (7) to (10), wherein the processing circuitry is configured to transmit an authorization of the occupant and the location of the first user device to a second user device.

(12) The device of (7) to (11), wherein the processing circuitry is configured to transmit to the first device, prior to the receiving, an instruction for the first device to acquire the digital credential to be received by the processing circuitry.

(13) The device of (7) to (12), wherein the processing circuitry is configured to determine an updated location of the first user device after authorizing the occupant.

(14) A non-transitory computer-readable storage medium for storing computer-readable instructions that, when executed by a computer, cause the computer to perform a method, the method comprising: receiving a digital credential of a first device, a location of the first device within a restricted perimeter, and an image of an area within the restricted perimeter; verifying the digital credential; identifying a presence of an occupant in the image; associating the occupant with the digital credential and the location of the first device based on the image; and authorizing the occupant based on the digital credential and the location of the first device.

(15) The non-transitory computer-readable storage medium of (14), wherein the digital credential is received from the first device using UWB communication and the first device is localized using UWB communication.

(16) The non-transitory computer-readable storage medium of (14) to (15), further comprising receiving the digital credential and the location of the first device from a second device.

(17) The non-transitory computer-readable storage medium of (14) to (16), further comprising generating a visualization of authorized occupants and unauthorized occupants within the restricted perimeter.

(18) The non-transitory computer-readable storage medium of (14) to (17), further comprising transmitting an authorization of the occupant and the location of the first device to a second device.

(19) The non-transitory computer-readable storage medium of (14) to (18), further comprising, prior to the receiving, transmitting to the first device, via the processing circuitry, an instruction for the first device to acquire the digital credential to be received by the processing circuitry.

(20) The non-transitory computer-readable storage medium of (14) to (19), further comprising updating the location of the first device after authorizing the occupant.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method for automated authorization within a restricted perimeter, comprising:

receiving, via processing circuitry over a communication network, a digital credential of a first device, a location of the first device within the restricted perimeter, and an image of an area within the restricted perimeter;

verifying, via the processing circuitry, the digital credential;

identifying, via the processing circuitry, a presence of an occupant in the image, which is of the area within the restricted perimeter;

associating, via the processing circuitry, the occupant with the digital credential and the location of the first device based on the image, which is of the area within the restricted perimeter;

authorizing, via the processing circuitry, the occupant based on the digital credential and the location of the first device;

after the authorizing, determining, via the processing circuitry, whether the location of the first device has changed over a predetermined period of time; and updating, via the processing circuitry, in response to determining the location of the first device has remained unchanged, an authorization of the occupant based on the digital credential and the location of the first device.

2. The method of claim 1, wherein the digital credential is received from the first device using ultra wide band (UWB) communication and the first device is localized using UWB communication.

3. The method of claim 1, further comprising generating a visualization of authorized occupants and unauthorized occupants within the restricted perimeter.

4. The method of claim 1, further comprising transmitting an authorization of the occupant and the location of the first device to a second device.

5. The method of claim 1, further comprising, prior to the receiving, transmitting to the first device, via the processing circuitry, an instruction for the first device to acquire the digital credential.

6. The method of claim 1, further comprising updating, via the processing circuitry, in response to determining the location of the first device has changed, the location of the first device.

7. The method of claim 1, further comprising, prior to the updating, receiving, via processing circuitry over the communication network, a signal from a pressure sensor, and determining whether the location of the first device is within a restricted area within the restricted perimeter based on the signal from the pressure sensor.

8. A device comprising:
processing circuitry configured to:
 receive, over a communication network, a digital credential of a first user device, a location of the first user device within a restricted perimeter, and an image of an area within the restricted perimeter,
 verify the digital credential,
 identify a presence of an occupant in the image, which is of the area within the restricted perimeter,
 associate the occupant with the digital credential and the location of the first user device based on the image, which is of the area within the restricted perimeter,
 authorize the occupant based on the digital credential and the location of the first user device,
 after the occupant has been authorized, determine, via the processing circuitry, whether the location of the first device has changed over a predetermined period of time, and
 update, via the processing circuitry, in response to the determination of whether the location of the first device has remained unchanged, an authorization of the occupant based on the digital credential and the location of the first device.

9. The device of claim 8, wherein the digital credential is received from the first user device using ultra wide band (UWB) communication and the first user device is localized using UWB communication.

10. The device of claim 8, wherein the processing circuitry is configured to receive the digital credential and the location of the first user device from a second user device via the communication network.

11. The device of claim 8, wherein the processing circuitry is configured to generate a visualization of authorized occupants and unauthorized occupants within the restricted perimeter.

12. The device of claim 8, wherein the processing circuitry is configured to transmit an authorization of the occupant and the location of the first user device to a second user device.

13. The device of claim 8, wherein the processing circuitry is configured to transmit to the first user device, prior to the receiving, an instruction for the first user device to acquire the digital credential.

14. A non-transitory computer-readable storage medium for storing computer-readable instructions that, when executed by a computer, cause the computer to perform a method, the method comprising:
 receiving, over a communication network, a digital credential of a first device, a location of the first device within a restricted perimeter, and an image of an area within the restricted perimeter;
 verifying the digital credential;
 identifying a presence of an occupant in the image, which is of the area within the restricted perimeter;
 associating the occupant with the digital credential and the location of the first device based on the image, which is of the area within the restricted perimeter;
 authorizing the occupant based on the digital credential and the location of the first device;
 after the authorizing, determining whether the location of the first device has changed over a predetermined period of time; and
 updating in response to determining the location of the first device has remained unchanged, an authorization of the occupant based on the digital credential and the location of the first device.

15. The non-transitory computer-readable storage medium of claim 14, wherein the digital credential is received from the first device using ultra wide band (UWB) communication and the first device is localized using UWB communication.

16. The non-transitory computer-readable storage medium of claim 14, further comprising receiving the digital credential and the location of the first device from a second device.

17. The non-transitory computer-readable storage medium of claim 14, further comprising generating a visualization of authorized occupants and unauthorized occupants within the restricted perimeter.

18. The non-transitory computer-readable storage medium of claim 14, further comprising transmitting an authorization of the occupant and the location of the first device to a second device.

19. The non-transitory computer-readable storage medium of claim 14, further comprising, prior to the receiving, transmitting to the first device an instruction for the first device to acquire the digital credential.

20. The non-transitory computer-readable storage medium of claim 14, further comprising updating the location of the first device after authorizing the occupant.

* * * * *